(12) United States Patent
Cazals et al.

(10) Patent No.: US 8,651,414 B2
(45) Date of Patent: Feb. 18, 2014

(54) AIRPLANE WITH A TAILCOAT TAIL ASSEMBLY AND REAR ENGINE

(75) Inventors: Olivier Cazals, Daux (FR); Jaime Genty De La Sagne, Toulouse (FR)

(73) Assignee: Airbus Operations S.A.S., Toulouse (FR)

( * ) Notice: Subject to any disclaimer, the term of this patent is extended or adjusted under 35 U.S.C. 154(b) by 75 days.

(21) Appl. No.: 13/255,720

(22) PCT Filed: Mar. 12, 2010

(86) PCT No.: PCT/FR2010/050437
§ 371 (c)(1),
(2), (4) Date: Feb. 7, 2012

(87) PCT Pub. No.: WO2010/103252
PCT Pub. Date: Sep. 16, 2010

(65) Prior Publication Data
US 2012/0138736 A1    Jun. 7, 2012

(30) Foreign Application Priority Data
Mar. 12, 2009  (FR) ...................................... 09 51561

(51) Int. Cl.
*B64C 1/00*    (2006.01)
(52) U.S. Cl.
USPC .................................. 244/13; 244/55; 244/54
(58) Field of Classification Search
USPC ................................................ 244/55, 54, 13
See application file for complete search history.

(56) References Cited

U.S. PATENT DOCUMENTS

| | | | | |
|---|---|---|---|---|
| 3,117,748 A * | 1/1964 | Gerlaugh | ........................ | 244/15 |
| 4,030,688 A * | 6/1977 | Pellarini | ........................ | 244/13 |
| 4,500,055 A * | 2/1985 | Krojer | ............................. | 244/55 |
| 7,240,877 B2 * | 7/2007 | Cazals et al. | .................... | 244/54 |
| 8,313,055 B2 * | 11/2012 | Gall et al. | ....................... | 244/55 |

(Continued)

FOREIGN PATENT DOCUMENTS

| | | |
|---|---|---|
| EP | 1 616 786 | 1/2006 |
| FR | 1 047 027 | 12/1953 |

(Continued)

OTHER PUBLICATIONS

International Search Report Issued Aug. 4, 2010 in PCT/FR10/050437 filed Mar. 12, 2010.

*Primary Examiner* — Tien Dinh
*Assistant Examiner* — Justin Benedik
(74) *Attorney, Agent, or Firm* — Oblon, Spivak, McClelland, Maier & Neustadt, L.L.P.

(57) ABSTRACT

An airplane, including a fuselage having an elongate shape along a longitudinal axis of the airplane, and at least one wing attached to the fuselage between front and back ends of the fuselage and a substantially cylindrical central portion and a rear scaleable portion on which a vertical tail assembly and a rear propulsion assembly are attached. Between a section for connecting the rear portion to the central portion of the fuselage and the back end: the maximum width of each fuselage section is constant or increases towards the rear up to a maximum fuselage width L; the height of each fuselage section decreases towards the rear, such that the back end of the fuselage forms a thin trailing edge substantially horizontal in the indicating line of the airplane and substantially rectilinear; a reactor for the propulsion assembly is provided in a so-called semi-buried configuration in the fuselage.

10 Claims, 8 Drawing Sheets

(56) References Cited

U.S. PATENT DOCUMENTS

Figure 1:
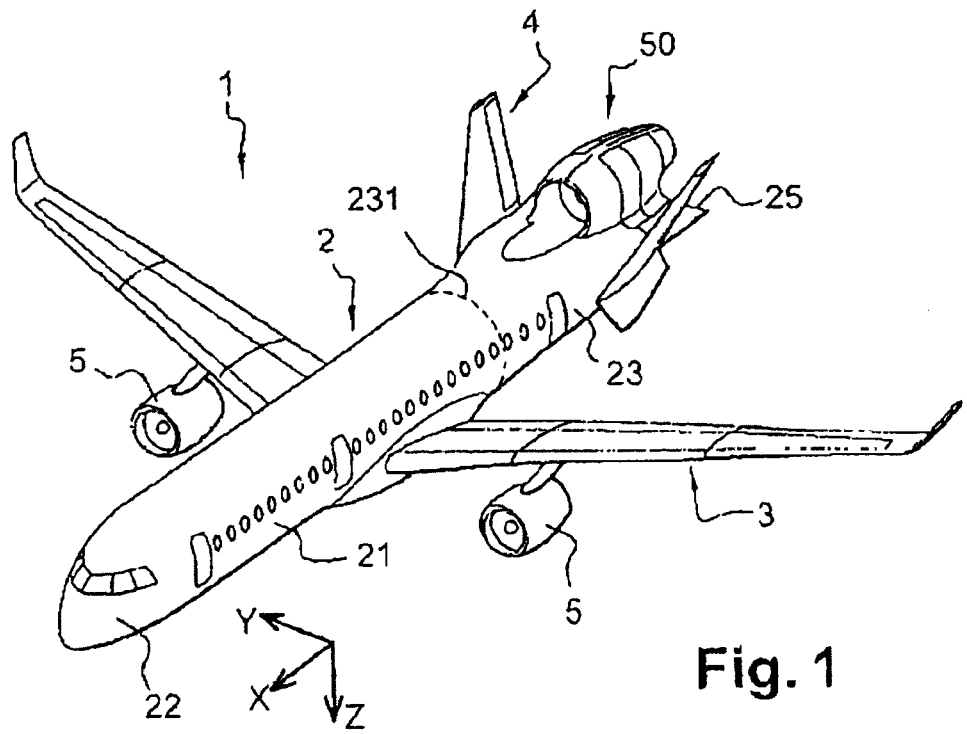

| | | | |
|---|---|---|---|
| 8,398,022 B2 * | 3/2013 | Cazals et al. | 244/119 |
| 2006/0011779 A1 * | 1/2006 | Cazals et al. | 244/54 |
| 2008/0073459 A1 * | 3/2008 | Cazals et al. | 244/13 |
| 2009/0026308 A1 | 1/2009 | Olivier et al. | |
| 2009/0084889 A1 * | 4/2009 | Cazals et al. | 244/12.1 |
| 2010/0133377 A1 * | 6/2010 | Cazals et al. | 244/55 |

FOREIGN PATENT DOCUMENTS

| | | |
|---|---|---|
| FR | 2 919 267 | 1/2009 |
| FR | 2 919 268 | 1/2009 |
| GB | 1 397 068 | 6/1975 |
| GB | 1 463 810 | 2/1977 |
| GB | 2 120 623 | 12/1983 |

* cited by examiner

AIRPLANE WITH A TAILCOAT TAIL ASSEMBLY AND REAR ENGINE

This invention belongs to the field of airplanes and more particularly airplanes comprising a fuselage to which there are attached a tail assembly and an engine in the rear part of the fuselage.

It is known, in the field of airplanes, especially commercial transport airplanes, to arrange a propulsion engine on the fuselage and more or less in the axis of the fuselage so as to increase the number of propulsion engines without needing to increase this number by two in order to adhere to a general symmetry of the airplane in relation to the vertical axial plane of the airplane.

This solution generally is used in order to increase the number of engines from two to three, the engine in the symmetry plane of the airplane being associated with engines beneath the wings as for example in the Lockheed 1011 or McDonnell Douglas DC10 airplanes, or with rear engines attached symmetrically on the sides of the fuselage as for example on the Boeing 727 airplane.

The installation of an engine in or on a rear fuselage, however, is a source of various problems, linked essentially to the increase in complexity of arrangement of the structures entailed by the installation of the rear engine in a zone of the fuselage already complex by reason of the presence of the rear tail assemblies and the progressive decreasing of the fuselage sections.

The airplane models cited comprise mainly a more or less elongated fuselage to which there is attached a wing in a median position along the length of the fuselage and to which there is attached in a rear part a tail assembly, a horizontal tail assembly and a vertical tail assembly, comprising various aerodynamic surfaces in order to ensure the aerodynamic stability of the airplane and its maneuverability by means of control surfaces associated with the tail assemblies.

In order to avoid an excessive base aerodynamic drag of the fuselage, the rear part of the fuselage is tapered and its section decreases progressively in height and in width from a standard fuselage section, corresponding to the rear part of a more or less cylindrical fuselage part, to a much smaller fuselage end section.

This rear part of the fuselage often is referred to as tail cone because of its overall shape similar to a frustum.

The horizontal tail assembly and the vertical tail assembly are made up of specialized aerodynamic surfaces that are attached onto the sides for the horizontal tail assembly and onto the top for the vertical tail assembly of the fuselage tail cone.

The axis of the tail cone is directed upward in relation to the axis of the cylindrical part of the fuselage in order to increase the possible angle of rotation of the airplane on the ground during takeoff and landing phases.

The decreasing of the sections of the fuselage associated with the presence of the tail assemblies therefore reduces the space available for installing the engine and decreases the intrinsic rigidity of the fuselage that is supposed to ensure the routing of thrust stresses of the engine and of inertial stresses, significant because of the weight of the engine, and the necessary space and rigidities are regained only at the price of complexities of structures and reinforcements which are expressed by increases in weight.

This proximity of the engine and the tail assemblies introduces additional complexities by virtue of the precautions that also must be taken in order to prevent possible debris that may be ejected by the engine from coming to unacceptably damage the tail assemblies.

The taking into account of all these constraints on arrangement of the rear part of the fuselage leads to an engine installation that is not very effective on the aerodynamic and propulsion efficiency level, since a rear engine on or in the fuselage in the known architectures has a propulsive efficiency 20% lower than that of an equivalent engine installed beneath a wing.

As a result of the combination of all the constraints set forth, an airplane with a conventional fuselage is penalized in its part devoted to the payload when the solution of a rear engine in the vertical symmetry plane of the airplane is considered:
  penalized in installation complexity;
  penalized in aerodynamics;
  penalized in structural weight.

In order to reduce the aerodynamic and weight penalties of the solutions of the prior art, the invention proposes a new arrangement of a rear fuselage part incorporating a propulsive assembly the installation of which is simplified.

The airplane according to the invention comprises in known manner a fuselage, for example a fuselage with elongated shape along a longitudinal axis X of the airplane oriented positively toward the front of the airplane, at least one wing attached to the fuselage between the front end and the rear end of the fuselage itself comprising a more or less cylindrical central part and a tapered rear part, joining the central part at a connecting section, on which a vertical tail assembly and a propulsive assembly are attached.

On the airplane of the invention, the rear part of the fuselage is of flattened shape and the engine or engines of the propulsive assembly are attached on top of the fuselage in the flattened-shape rear part and partially inside the fuselage according to a semi-buried configuration.

The flattened, so-called tailcoat shape is such that, at the tapered rear part of the fuselage:
  the maximum height of each fuselage section decreases toward the rear in the negative X's direction, so that the rear end of the fuselage forms a trailing edge, in practice a trailing edge of relatively slight thickness and advantageously more or less horizontal in an airplane reference line and more or less rectilinear, with width L strictly greater than the maximum width of the connecting section;
  the maximum width of each fuselage section increases continuously, that is to say that it increases unchangingly toward the rear in the negative X's direction from the maximum width of the connecting section up to the maximum width L greater than the maximum width of the connecting section;
  the rear engine or engines of the rear propulsive system preferably are situated along the longitudinal direction, in a zone of the rear part of the fuselage of more or less maximum width;
  the longitudinal axis of the rear engine or engines, more or less parallel to the longitudinal axis X, is in a preferred embodiment situated at the air intake of the rear engine, above the central part of the fuselage;
  the lower part of the rear engine or engines, at a maximum diameter of the rear engine, is partially inside the fuselage, and an upper part of the engine is on top of the fuselage according to the semi-buried configuration.

Moreover, the nacelle of the rear engine or engines, with width lesser than the width of the fuselage in the zone of the nacelle, joins laterally with the fuselage on each side of the nacelle so that the fuselage has a flattened zone extending on each side of the nacelle.

In a preferred arrangement, the rear engine is arranged along the longitudinal direction of the airplane so that a front end of the rear engine is situated behind an impervious rear base of a cabin of the fuselage.

In order to ensure control in pitch of the airplane, the rear part of the fuselage comprises, on each side of the rear propulsive assembly, a fuselage control surface jointed onto the fuselage around an axis more or less horizontal in an airplane reference line and the trailing edge of which corresponds to the end of the fuselage.

In order to ensure stability and control in yaw, the vertical tail assembly comprises two more or less vertical stabilizers attached to the rear part of the fuselage advantageously in front of the fuselage control surfaces in order to prevent mechanical interferences between the fuselage control surfaces and the stabilizers and their rudders, each stabilizer being made with the fuselage on one edge, respectively right and left of the airplane, of the rear part of the fuselage, for example in a zone corresponding more or less to the zone of maximum width L so as to limit the risks of interference with the propulsive assembly installation.

Moreover, in order to limit the risks of damaging the structure of the stabilizers in the event of breakup of rotating parts of a rear engine, the longerons of the stabilizers are arranged along the longitudinal direction X on the rear part of the fuselage in relation to the rear engines so that the longerons are located outside the zones of ejection of debris from the engines.

In order to limit downward noise emission of the engine, in particular when the airplane is close to the ground, a movable structure of the rear part of the fuselage comprises at least one retracted position in which the said movable structure is situated inside the rear part of the fuselage in order not to penalize the aerodynamics of the airplane in cruising condition and comprises at least one extended position in which the movable structure forms an extension toward the rear of the trailing edge of the fuselage at its rear end, more or less in a horizontal plane of an airplane reference line and beneath the rear propulsive assembly.

The movable structure advantageously extends along a span corresponding more or less to a distance separating the control surfaces of the fuselage.

In the extended position, the mobile structure creates a sound-reflecting shield that prevents propagation of the noises emitted downward, therefore toward the ground, by the nozzle of the engine or engines in particular during low-altitude flight phases.

For the structural design of such a fuselage rear-part arrangement, the fuselage comprises, behind a rear cabin base such as an impervious base of a pressurized cabin, load-carrying frames to take up the various stresses introduced into the fuselage.

The said load-carrying frames include stabilizer frames arranged to take up the stresses introduced into the fuselage by the stabilizer longerons.

The said load-carrying frames comprise engine frames that are each provided in their upper part with an arch having an opening having more or less the dimensions of the air intake of the rear engine or engines in order to prevent interferences between the structure of the arches and the air intake of the engine or engines.

The engine frames preferably are arranged in front of the rear engine and have sufficient structural strength to take up the stresses introduced into the structure of the fuselage by the rear engine.

For reasons of safety, all or part of the load-carrying frames preferably is made of two juxtaposed parts according to a design referred to as "fail-safe."

In order to maintain known attachment principles for the rear engine or engines, the latter is/are attached suspended beneath a structural beam cantilevered behind the engine frames, a structural beam integral with the arches and preferably, for reasons of safety, made of two juxtaposed parts according to a design referred to as "fail-safe."

The rear part of the fuselage also preferably comprises two longitudinal ribs, more or less in a vertical plane in an airplane reference line, integral with at least one load-carrying frame and extending toward the rear, cantilevered from a rear load-carrying frame, more or less up to the rear end of the fuselage.

These ribs define between themselves, beneath the rear engine or engines, a maintenance well clear of any obstruction, via which a rear engine may be removed by gravity in order to facilitate removal or installation of the engine during a maintenance operation.

In order to close the maintenance well again in the absence of maintenance operations, the well comprises movable hatches ensuring, in closed position, the aerodynamic continuity of the lower part of the rear part of the fuselage.

In order to respond to various types of maintenance operations, the movable structure advantageously comprises a first retracted position in which it is situated beneath the propulsive assembly in the zone of the maintenance well and a second retracted position in which the movable structure is brought forward in relation to the first retracted position, in which it is situated in front of the propulsive assembly and clears the maintenance well.

A last frame or rear frame comprises two outer portions integral with the longitudinal ribs of the side opposite the maintenance well.

The fuselage control surfaces are jointed onto this rear frame; more precisely each control surface is jointed onto the outer portion of the rear frame of the side where the control surface considered is situated.

In order to ensure effective aerodynamics of the rear propulsive assembly, the rear engine or engines comprises/comprise a nacelle which provides the internal and external shapes of the propulsive assembly.

Preferably, for reasons of access to the engines during maintenance operations, at least between an air intake structure at the front and a nozzle structure at the rear, sub-assemblies forming movable cowlings are jointed at the structural beam.

In one embodiment of the invention, the airplane comprises an engine of a first type on each side of the airplane attached beneath the wing and comprises a rear engine of the rear propulsive assembly of a second type having a reference thrust more or less greater than that of the first type so as to decrease the thrust necessary for the engines of the first type and to reduce the level of noise emitted by the engines beneath the wing and to decrease the height of the fuselage above the ground when the airplane is on the ground for a given ground clearance of the engines as a result of the smaller diameter of the engines beneath the wing.

Figure 2A:
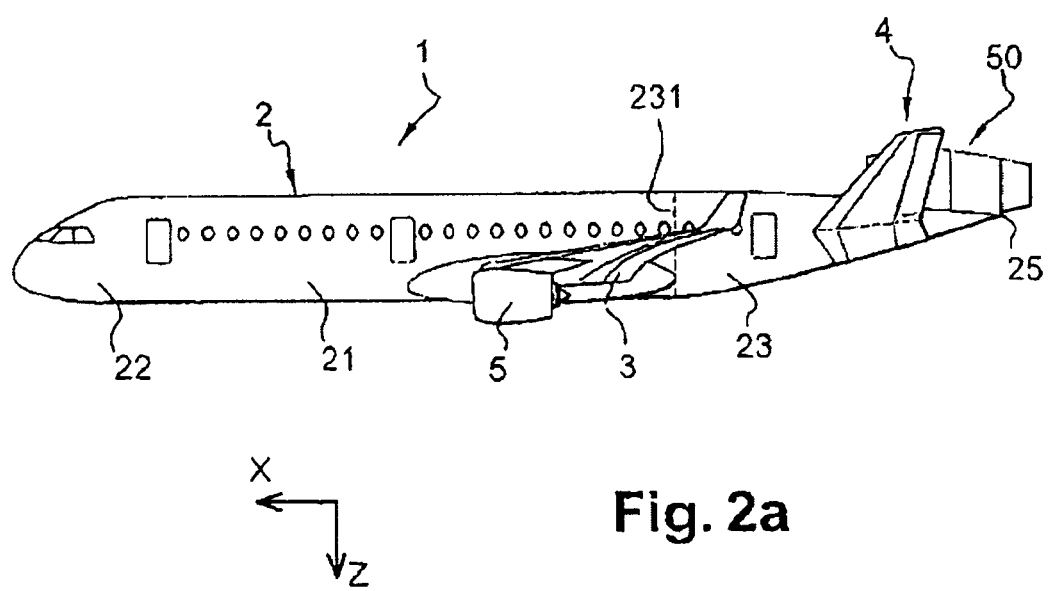
Figure 2B:
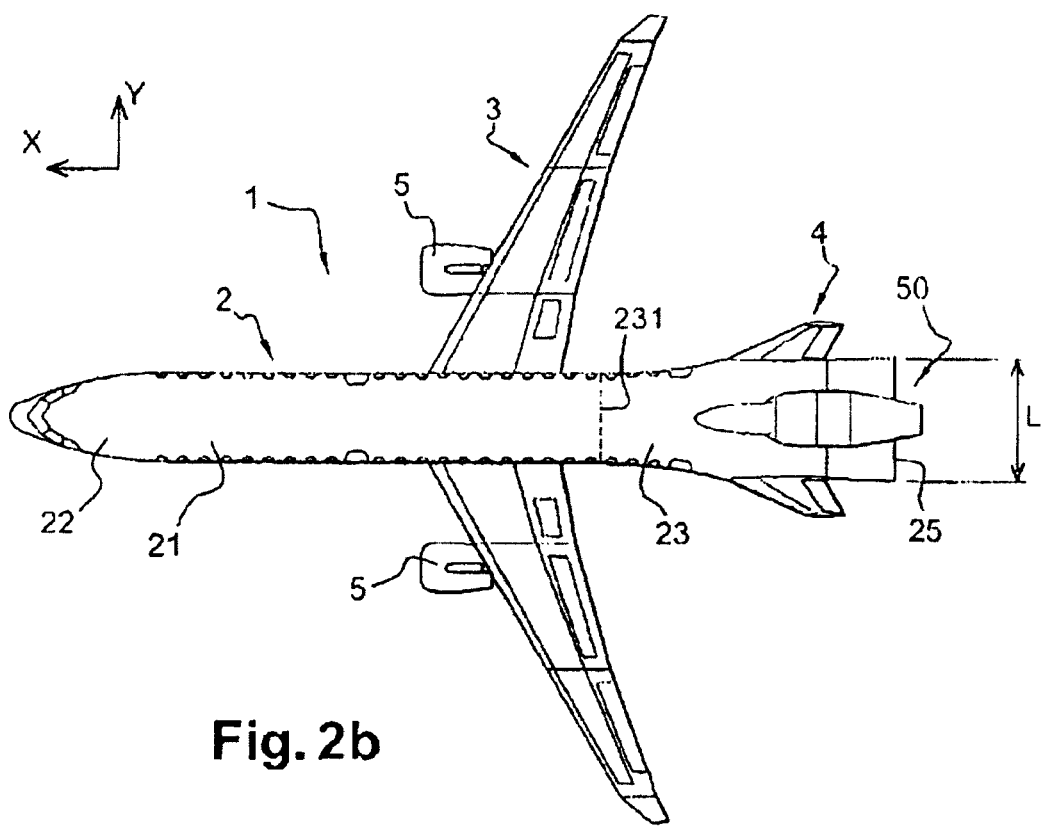
Figure 2C:
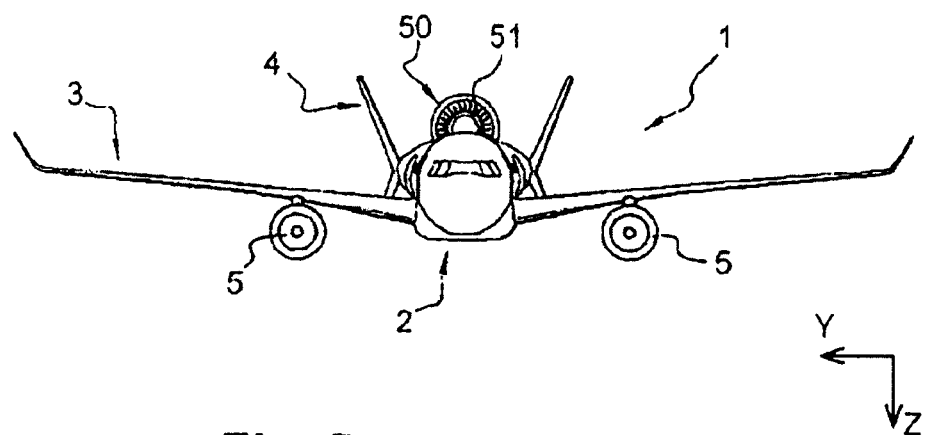
Figure 4A:
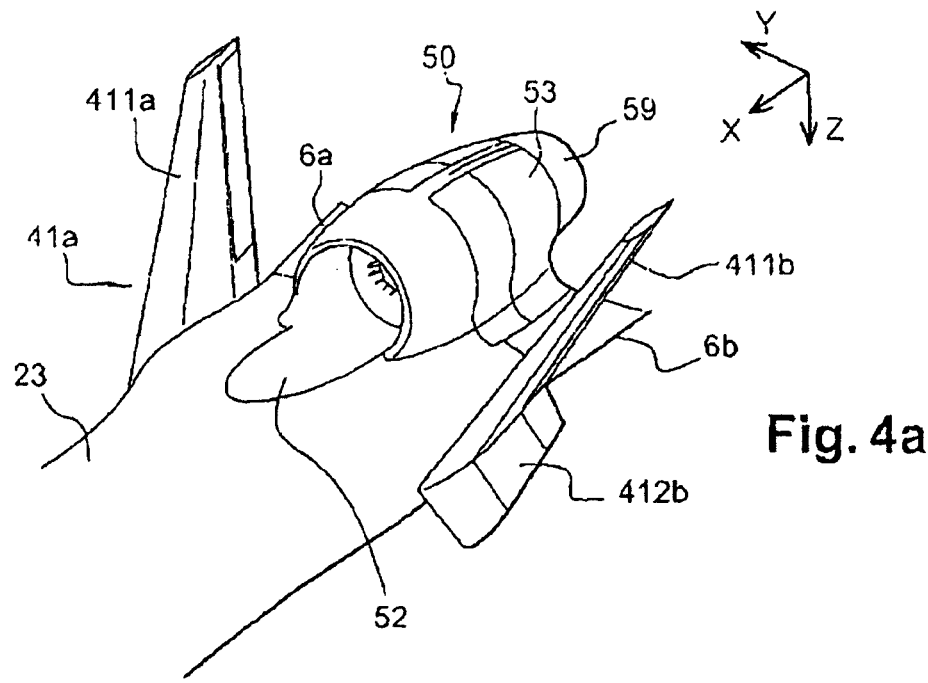
Figure 4B:
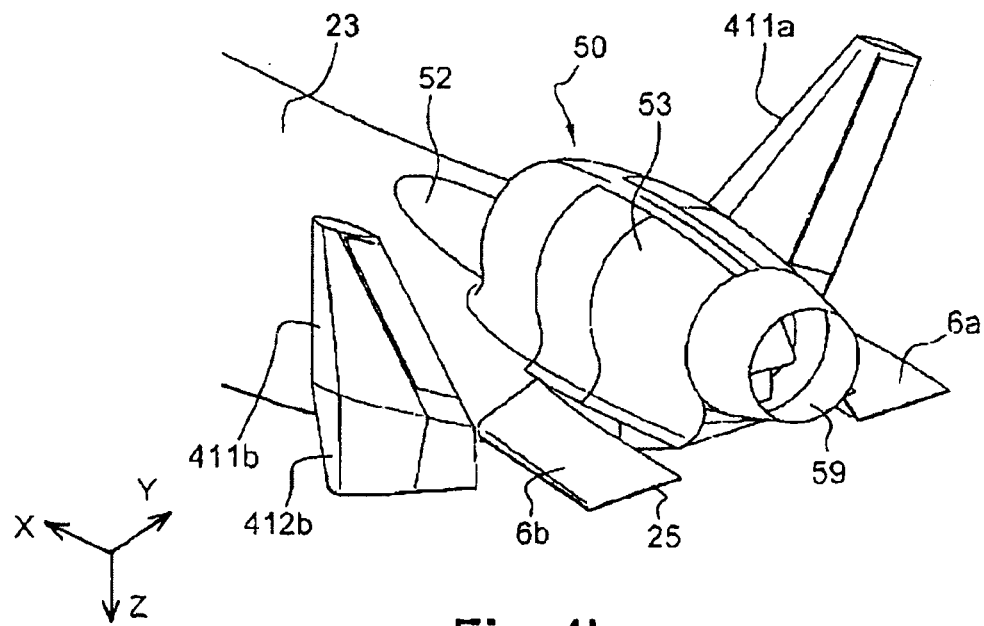
Figure 5A:
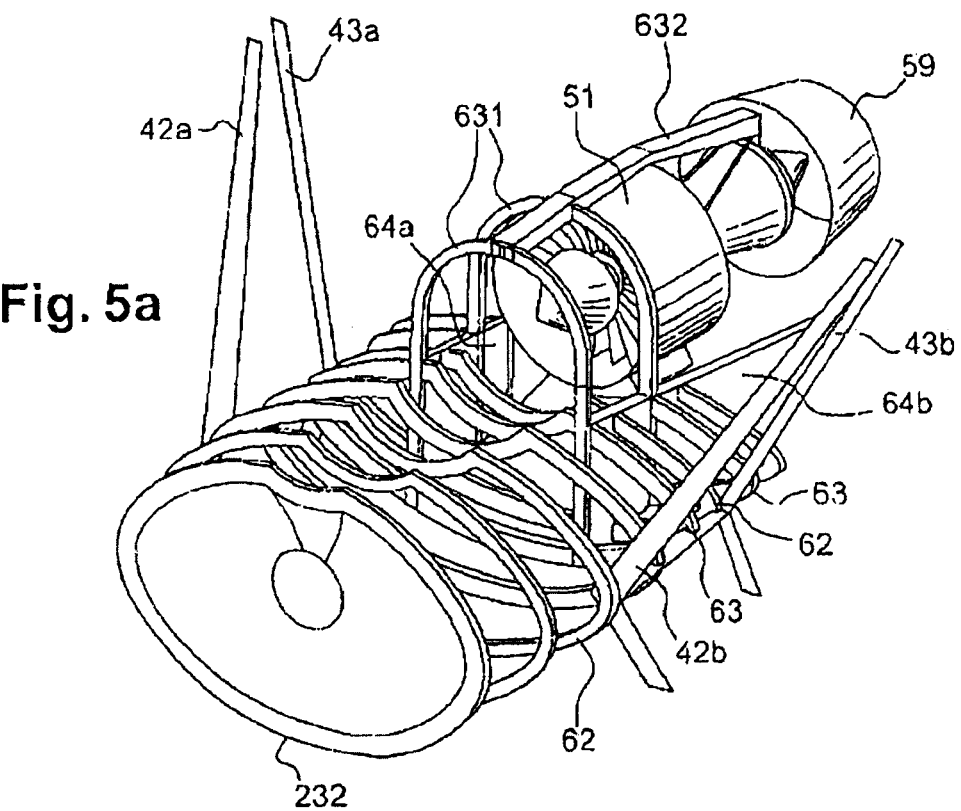
Figure 5B:
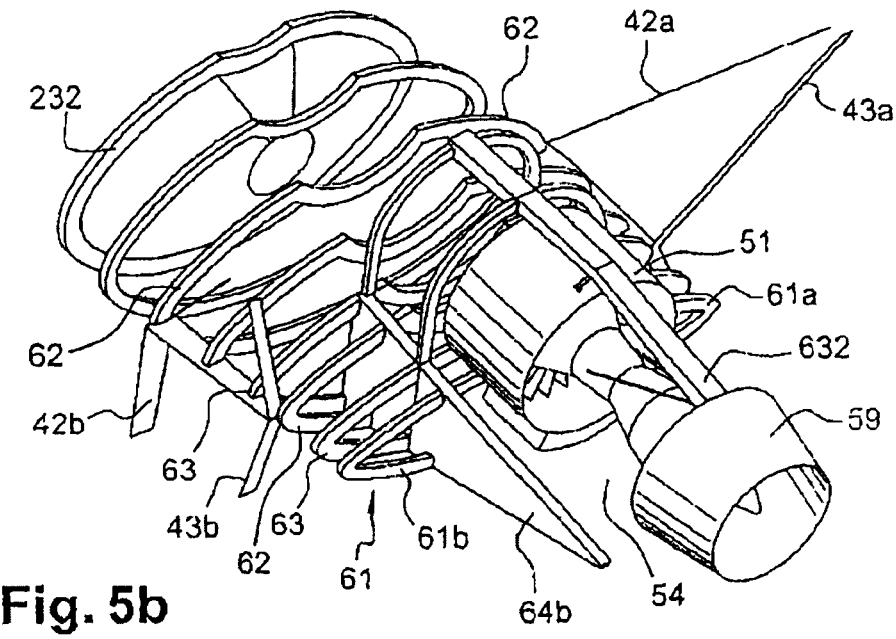
Figure 6A:
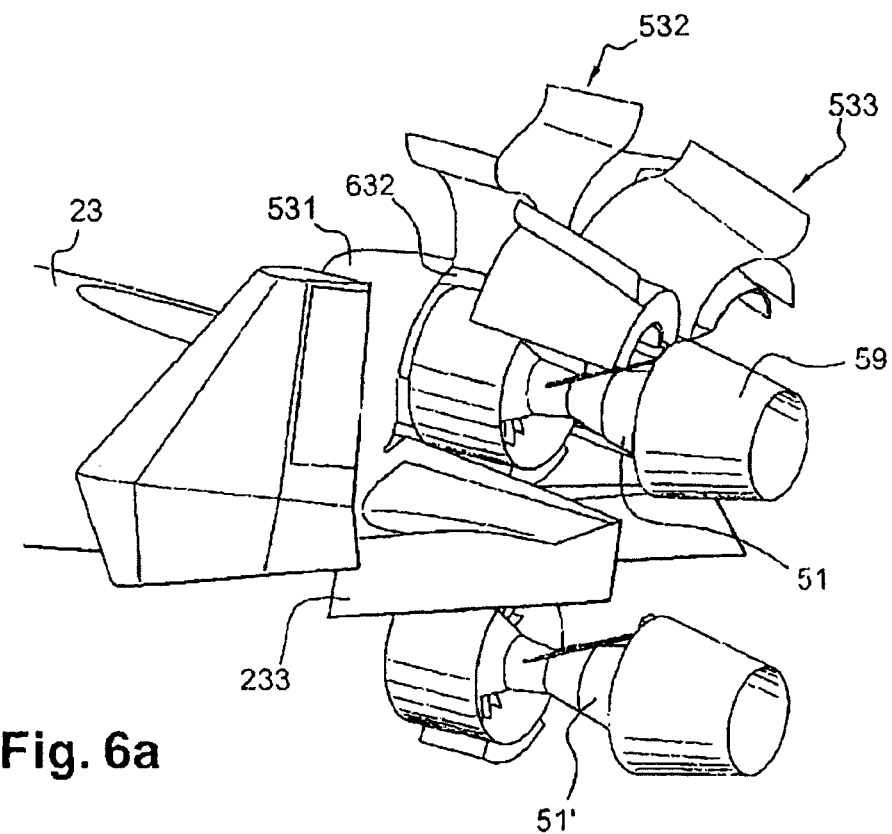
Figure 6B:
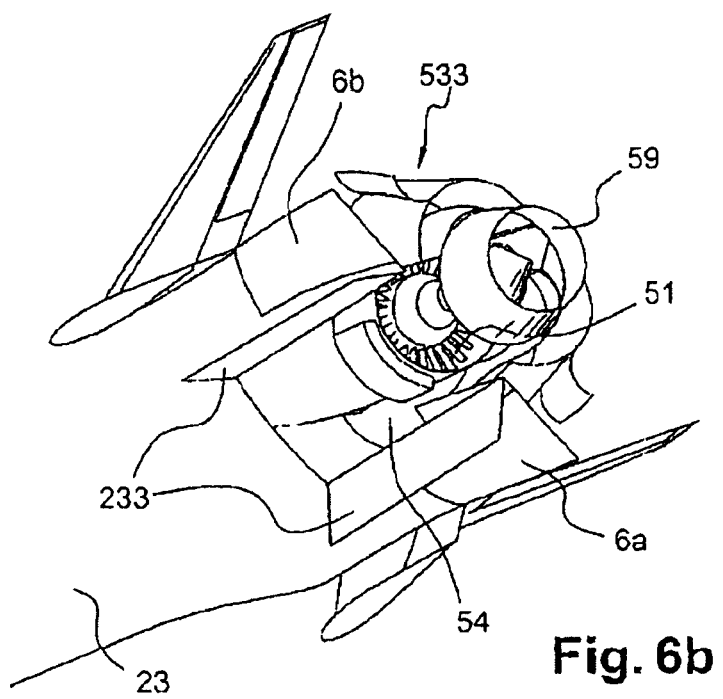
Figure 7A:
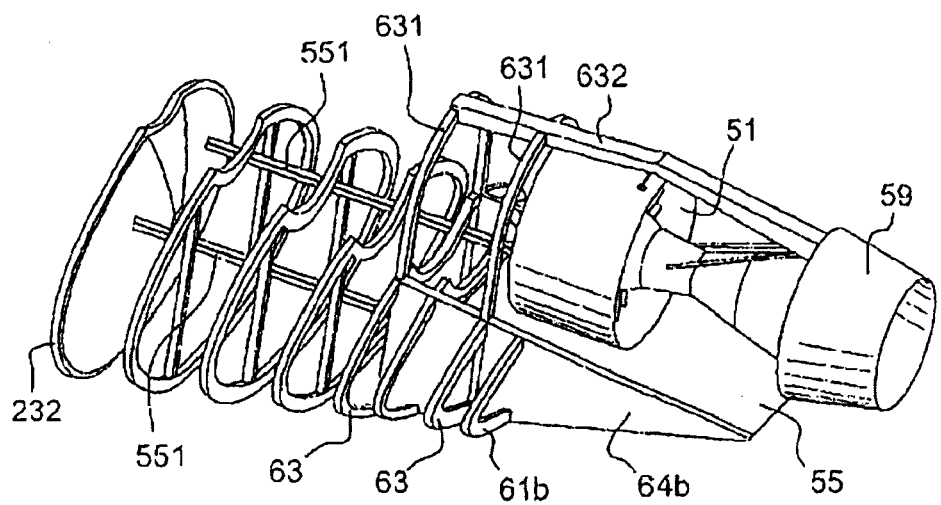
Figure 7B:
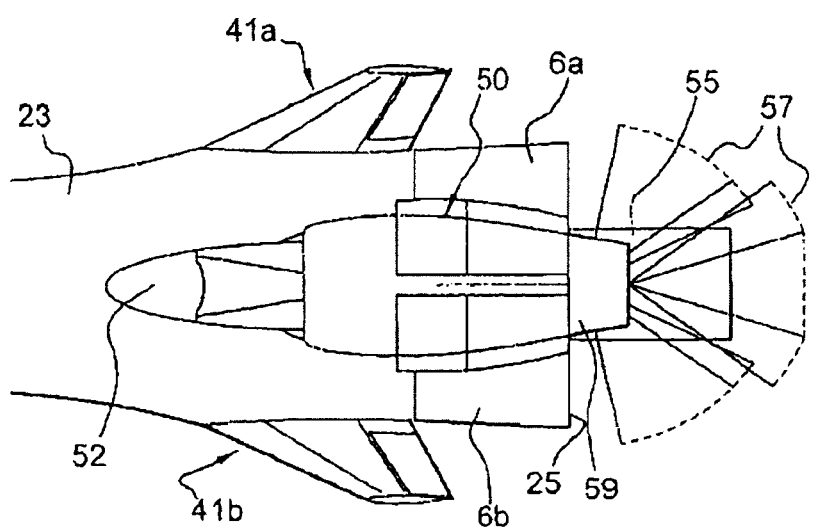

The detailed description of exemplary embodiments of the invention is presented with reference to the Figures which schematically show:

FIG. 1: an overall perspective view of an exemplary airplane according to the invention;

FIGS. 2a to 2c: views in profile (FIG. 2a), from above (FIG. 2b), from the front (FIG. 2c) of the airplane of FIG. 1;

FIGS. 3a to 3d: views from the side (FIG. 3a), from the rear (FIG. 3b), from above (FIG. 3c) and from below (FIG. 3d) of the rear end of the fuselage of the airplane of FIGS. 1 and 2;

FIGS. 4a and 4b: perspective views from the front and from the rear respectively of the rear end of the fuselage of the airplane of FIGS. 1 and 2;

FIGS. 5a and 5b: cut-away views of the rear part of the airplane of FIG. 1;

FIGS. 6a and 6b: perspective views of the rear part of the fuselage with the rear nacelle cowlings open;

FIG. 7a: a cut-away perspective view of the rear part with the rear movable structure in retracted position;

FIG. 7b: a view of the rear part from above, with the rear structure in extended position and showing the directions of noise emission from the rear engine.

As illustrated by way of non-limitative example on FIG. 1 in perspective and on FIGS. 2a to 2c according to various view in projection, an airplane 1 according to the invention comprises an elongated fuselage 2, a wing 3 attached to the fuselage and a vertical tail assembly 4 attached to the fuselage on a part of fuselage 2 situated more or less behind wing 3.

In accordance with the conventions used in the field of airplane design, airplane 1 is, for the purposes of the description, associated with an airplane reference line defined by:

an axis X corresponding to a longitudinal axis of airplane 1 and of fuselage 2, oriented positively toward the front of the airplane in the direction of flight;

an axis Z corresponding to a vertical axis of airplane 1, that is to say an axis perpendicular to the axis X in a vertical symmetry plane XZ of the airplane, and oriented positively toward the lower part of the airplane;

an axis Y perpendicular to the airplane symmetry plane XZ and forming with axes X and Z a direct trihedron, that is to say that Y is oriented positively toward the right of airplane 1.

For the purposes of the description, the terms front, rear, high, low, above, below, right and left shall have the ordinary meaning such as, for example, a pilot of the airplane views them.

In particular:

in front or toward the front means on the side of the positive X's and behind or toward the rear means on the side of the negative X's;

toward the top or above means on the side of the negative Z's and toward the bottom or beneath means on the side of the positive Z's;

on the right or toward the right means on the side of the positive Y's and on the left or toward the left means on the side of the negative Y's.

Elongated fuselage 2 comprises a more or less cylindrical part 21, for example with circular section or multilobate section or even elliptical section, as well as, at the front of the said central part, a tapered front part 22 in which a cockpit generally is located and at the rear a tapered rear part 23 onto which vertical tail assembly 4 is attached.

Wing 3 is attached to fuselage 2 in a lower part of the fuselage, as on the illustrations of FIGS. 1 and 3, or else is attached in an upper part of the fuselage or even in an intermediate height position, solutions not illustrated.

Propulsion engines 5 are attached to the wing in known manner.

The geometry of tapered rear part 23 of fuselage 2 corresponds to a shape gradually flattening toward the rear.

Thus considering at every point along the longitudinal direction X of the fuselage a maximum width along direction Y and a maximum height along direction Z of a section in the plane ZY of the said fuselage at the said point, the maximum heights of the sections decrease continuously from a front section 231, referred to as connecting section, which represents the geometric rear limit of central part 21, up to a rear end 25 of the fuselage at which the height is more or less equal to zero, in practice the thickness of an aerodynamic control surface trailing edge as will be understood later in the explanation.

Moreover, the tapering of the height of the sections is such that the lower part of rear tapered part 23 of the fuselage goes up more rapidly than the upper part of the said tapered rear part goes down as is visible on FIG. 2a leading to an upper part relatively, in comparison with the lower shape, in the extension of the upper part of central part 21 of the fuselage.

Moreover, unlike the height, the widths of the sections of tapered rear part 23 of the fuselage increase continuously from front connecting section 231 up to rear end 25 as illustrated on FIG. 2b at which end the width of the fuselage is strictly greater than the maximum width of the said connecting section.

The expression "increases continuously" here is to be regarded in a general sense, that is to say that the said maximum local width increases or else remains constant so that the maximum width in this rear part follows an unchangingly increasing rate. In particular, the shape of the rear part is such that the maximum width of the fuselage in this part may be kept constant over a more or less considerable distance along X.

Figure 3A:
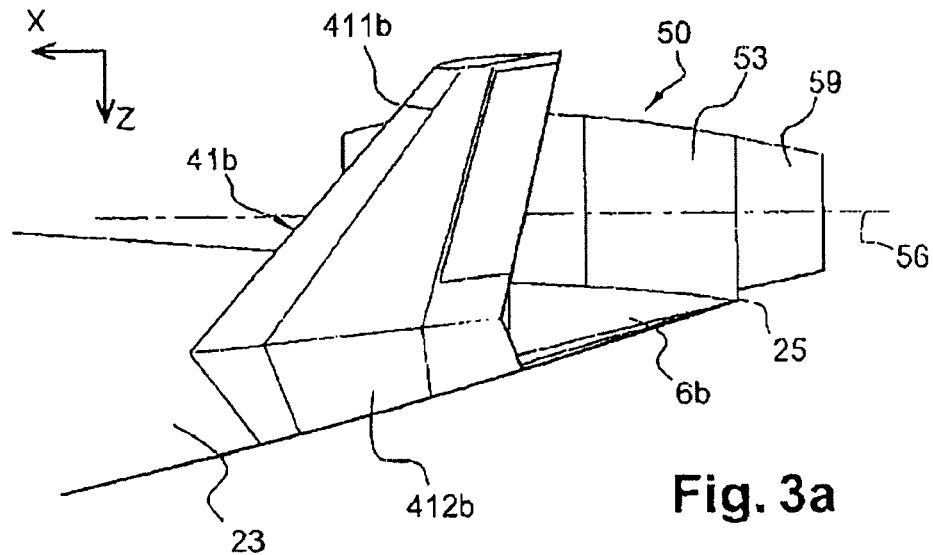
Figure 3B:
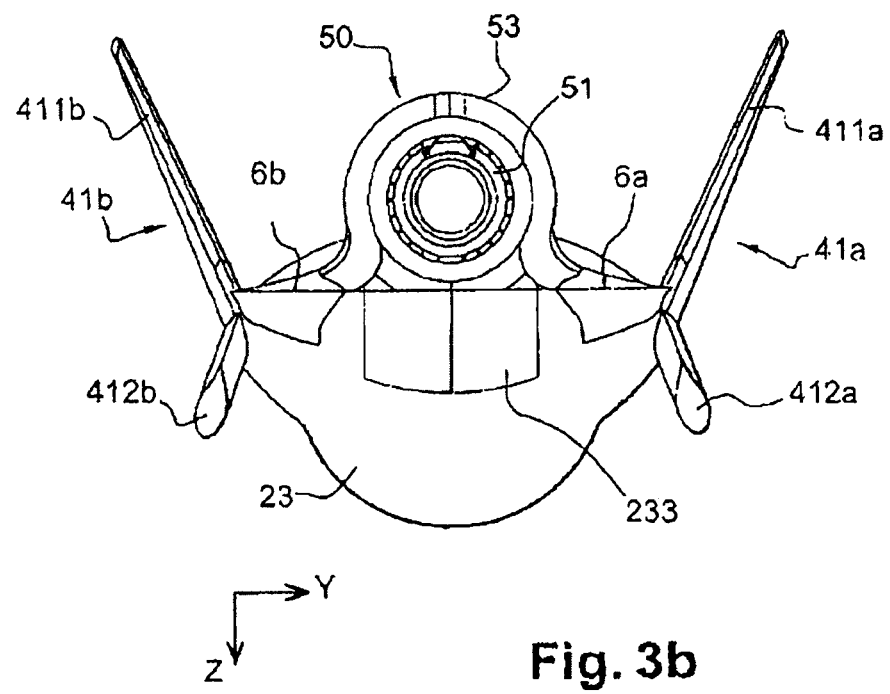
Figure 3C:
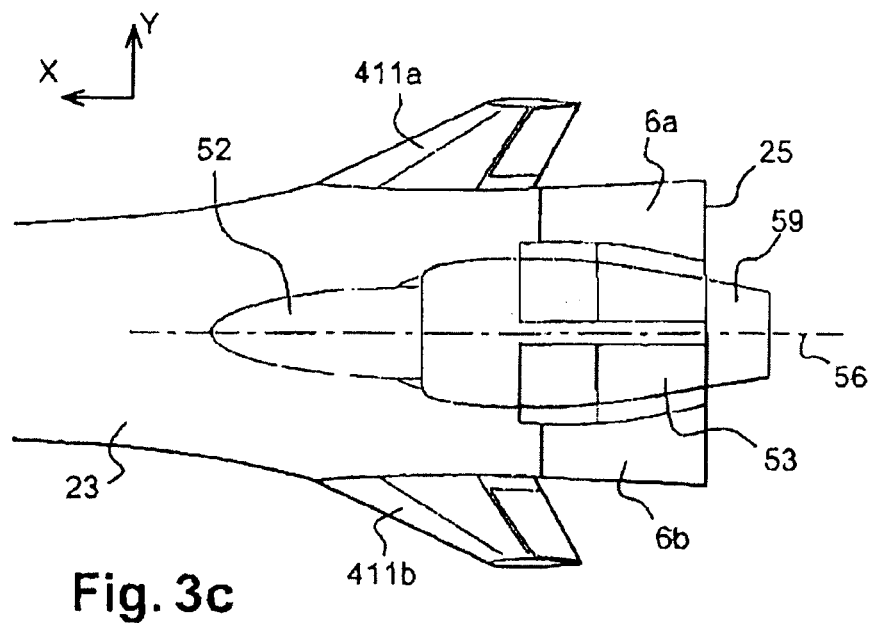
Figure 3D:
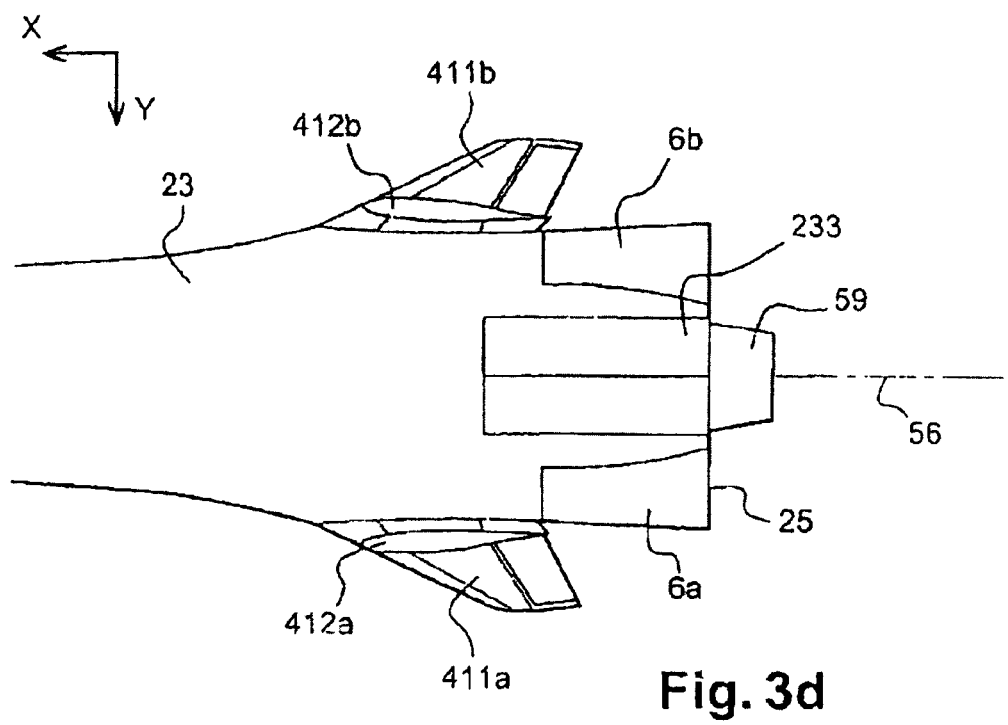

In the illustrated example, as is clearly shown on FIGS. 2b, 3c and 3d, the maximum width of rear part 23 is more or less constant on the one hand in a front zone of the said rear part behind front connecting section 231 and on the other hand in a rear zone of the said rear part on the side of end 25 of greater width.

Close to rear end 25 of fuselage 2, that is to say in a zone terminating with a height more or less equal to zero, the fuselage thus has a width L greater than the maximum width of fuselage 2 of airplane 1 in the central part, giving it a shape referred to as tailcoat.

The said tailcoat shape is characterized in particular by a relatively flat upper zone the detailed characteristics of which will be explained farther on in the description.

Moreover, a rear propulsive assembly 50 is arranged above the fuselage in tapered rear part 23 corresponding to the relatively flat upper zone.

Rear propulsive assembly 50 comprises a rear engine 51 with longitudinal axis 56 more or less in vertical symmetry plane XZ of fuselage 2.

Rear engine 51 is positioned overhead above the fuselage so that, at a maximum diameter of the engine, in practice the diameter of an air intake fan casing of a dual-flow engine, a center of the air intake of the engine is located above the upper part of central part 21 of the fuselage and preferably so that a lower part of the engine is inside rear part 23 of the fuselage according to a configuration referred to as partially buried.

In such a configuration partially buried in the fuselage, a lower part of engine 51 therefore is beneath the upper surface of the rear part of the fuselage.

In order to ensure a correct aerodynamic flow at an air intake of engine 51, the upper surface of rear part 23 of the fuselage comprises a recessed part 52, forming a surface extending the air intake, referred to as air intake upstream channel, situated in the continuation of the lower part of the air intake which is buried in the fuselage. Such an air intake upstream channel corresponds more or less to the intersection of a cylindrical surface with the space of rear part 23 of the fuselage.

In the example illustrated on the various Figures, engine 51 is arranged on rear part 23 of the fuselage so that a rear end of the said engine is situated behind rear end 25 of the fuselage, for example with an overhang of engine 51 behind rear end 25 of the fuselage corresponding to all or part of an outlet nozzle 59 of the engine.

Such an arrangement which advantageously is applied in the case of an engine with a nozzle referred to as long nozzle is not essential, however, and in other configurations of the invention, not illustrated, the rear end of rear engine 51 or the rear end of the nacelle of the said rear engine is positioned more or less at rear end 25 of the fuselage, or even in front of the said rear end.

Propulsive assembly 50 also comprises a rear nacelle 53 which surrounds rear engine 51 for the part of the said rear engine that is not buried, visible in particular on FIGS. 3a to 3c.

Similarly to a conventional ring-shaped nacelle, rear nacelle 53 ensures the quality of the aerodynamic flows, crossing the engine, downstream and upstream from the actual engine, in particular at the air intake and at the nozzle, and the quality of the external flows around the said rear nacelle.

The shapes of rear nacelle 53, which is of lesser width than the width of the fuselage in the zone of the said nacelle, join with the upper surface of rear part 23 of the fuselage in order to ensure the aerodynamic continuity of the said surfaces which extend laterally on each side of the nacelle.

The geometry of such connecting shapes in practice is worked out by digital methods or experimental methods so as to minimize the aerodynamic drag of the airplane, a general objective of airplane designers, but also in the present case in order to guarantee a good aerodynamic flow over parts of rear fuselage 23 situated on each side of rear nacelle 53 in the various flight configurations of the airplane and the various operating conditions of rear engine 51.

Rear end 25 forms a trailing edge, more or less rectilinear and with width L, of rear part 23 of the fuselage as a result of the convergence of the more or less flat upper surface in a rear part, outside nacelle 53, of rear part 23 of the fuselage and of the also more or less flat lower surface of the said rear part close to the rear end of the fuselage.

An aerodynamic control surface 6a, 6b, referred to as fuselage control surface, visible in particular on FIGS. 3a to 3d, is arranged in this rear part of fuselage 2 on each side of rear nacelle 53 at the trailing edge at rear end 25.

Each fuselage control surface 6a, 6b, is jointed in its front part around a more or less horizontal axis so as to allow a control of the airplane around a pitch axis parallel to the direction Y.

Vertical tail assembly 4 comprises two more or less vertical stabilizers 41a, 41b attached to the fuselage, one on each side of rear part 23, situated close to rear end 25 but in front of fuselage control surfaces 6a, 6b.

The longitudinal position of stabilizers 41a, 41b, preferably is brought forward sufficiently so that on the one hand interferences between fuselage control surfaces 6a, 6b, and stabilizers 41a, 41b, are prevented and on the other hand stabilizers 41a, 41b are outside the zones of possible ejection of engine debris.

The stabilizers are provided in known manner with trailing edge control surfaces in order to ensure control of the airplane around axis Z referred to as yaw axis.

Each stabilizer 41a, 41b, comprises an upper stabilizer 411a, 411b, with vertical upward extension and preferably, as on the exemplary airplane of the illustrations, comprises a lower stabilizer 412a, 412b, with vertical downward extension, limited in order not to introduce a bothersome constraint on a maximum stability on nose-up of the airplane on the ground.

These characteristics of rear part 23 of the fuselage appear more clearly on the details of FIGS. 4a and 4b presented in perspective view.

FIGS. 5a and 5b present cut-away views of rear part 23 of the fuselage in which skin panels of the fuselage, stabilizers 41a, 41b and rear nacelle 53 are not shown, so that only main internal components of the structure are shown.

More precisely, only a part behind a rear base 232 is shown.

Rear base 232 corresponds, for example, to a rear limit of extension of a pressurized cabin in the fuselage. As FIGS. 5a and 5b illustrate by the shape of impervious rear base 232 the maximum height of which is more or less reduced in relation to the maximum width, the said rear base is situated behind connecting section 231, in tapered rear part 23 of the fuselage.

This moved-back position of impervious rear base 232 is possible precisely because of the shape of rear part 23 of the fuselage of the airplane of the invention and the position of rear propulsive assembly 50 behind the said impervious rear base, that is to say that a front end of rear engine 51 is situated behind impervious rear base 232, which makes it possible to maintain a more or less constant width of a cabin floor with a usable cabin height in a position farther back than in the case of a fuselage having a conventional rear cone while guaranteeing that the spaces of the pressurized cabin in front of impervious rear base 232 are outside the breakup zones of the rear engine in which engine debris may be ejected.

In the illustrated case, the shape of impervious rear base 232 also comprises an upper indentation corresponding to the local shape of the upstream air intake channel 52 which in this example extends up to in front of the said rear base.

Behind rear base 232, between the said rear base and a rear frame 61, rear part 23 of the fuselage comprises intermediate frames providing the shape of the fuselage including load-carrying frames 62, 63.

According to their positions in rear part 23 of the fuselage, load-carrying frames 62, 63 of the said rear part provide specific functions.

Fuselage control surfaces 6a, 6b, not shown on FIGS. 5a and 5b, are jointed onto rear frame 61, the rearmost fuselage frame.

A family of load-carrying frames 62, referred to as stabilizer frames, is used for taking up the stresses of stabilizers 41a, 41b of the vertical tail assembly. Corresponding load-carrying frames 62 are mainly frames at front longerons 42a, 42b and rear longerons 43a, 43b of the stabilizers.

A family of load-carrying frames 63, referred to as engine frames, at least two in number and situated in front of rear engine 50, is used for supporting the said rear engine.

Each engine frame 63 comprises an arch 631 projecting above the said frame.

A beam 632 is integral with arches 631 in their upper parts and extends cantilevered toward the rear over a distance corresponding more or less to the rearmost part of rear nacelle 53.

Beam 632 thus is above engine 51 which is attached suspended beneath the said beam, advantageously by a conventional method by means of CORE-type fasteners at the gas generator of the engine and/or FAN-type fasteners at the fan casing of the engine.

The shapes and sizes of arches 631 also ensure clearing of the air intake upstream from rear engine 51 bypassing the airflow of the air intake of the engine.

Because of the high safety level expected of a device for attaching an engine, beam 632 and engine frames 63 are made according to a structural design referred to as "fail-safe," each structural element being made of two juxtaposed parts in order to compensate for the failure of one of the said two parts.

If need be, a load-carrying frame may serve as both stabilizer frame and engine frame.

In practice, rear frame 61 is made up of two rear half-frames 61a, 61b so that a space 54 or maintenance well beneath engine 51, corresponding to the space swept by engine 51 in a vertical descent movement beneath beam 632, is not traversed by the said rear frame.

Rear half-frames 61a, 61b are integral with exterior faces of longitudinal ribs 64a, 64b respectively, and the said ribs and the said ribs determine between interior faces of the said ribs the maintenance well 54 via which rear engine 51 may be lowered or installed during removal or installation operations.

Longitudinal ribs 64a, 64b are kept integral with load-carrying frames 62, 63 and continue toward the rear cantilevered behind a rear load-carrying frame, corresponding to the rearmost of the load-carrying frames, so as to transmit the stresses of rear half-frames 61, 61b onto which fuselage control surfaces 6a, 6b are jointed.

As illustrated on FIG. 6a, nacelle 53 comprises, at least behind an air intake structure 531 and an engine outlet nozzle structure 534, movable cowlings 532, 533.

Movable cowlings 532, 533 preferably are jointed at beam 632 so as to be able to be removed during maintenance operations.

On the lower surface of rear fuselage 23, between longitudinal ribs 64a, 64b, movable hatches 233, for example jointed at the said longitudinal ribs, in a first position referred to as closed, FIG. 3d, close off maintenance well 54 and ensure the aerodynamic continuity of the fuselage and, in a second position referred to as open, FIG. 6b, free up the maintenance well allowing passage of the engine between positions 51 and 51' of the engine illustrated on FIG. 6a or to allow access underneath the lower parts of the engine, in particular for operations that cannot be performed without this access.

In one embodiment, as illustrated on FIGS. 7a and 7b, a retractable structure 55 is arranged movable in rear part 23 of the fuselage.

Retractable structure 55 is of a width more or less equal to the distance separating longitudinal ribs 64a, 64b, that is to say the width of maintenance well 54 and may assume at least two positions.

In a first position, referred to as retracted, FIG. 7a, retractable structure 55 is situated inside the fuselage and in a second position, referred to as extended, the said retractable structure extends behind the rear end of the fuselage, more precisely more or less horizontally and beneath rear engine 51 as illustrated on FIG. 7b in a view from above.

Retractable structure 55 is, for example, guided by lateral guiding rails 551.

In the position illustrated on FIG. 7a, retractable structure 55 is situated beneath rear engine 51, at maintenance well 54, in a first retracted position which, if need be, allows an operator performing a maintenance task on the engine to work with an enhanced safety in particular when movable hatches 233 are open.

The said retractable structure advantageously also comprises at least one second retracted position in which the maintenance well remains clear for operations of installation and removal of rear engine 51 and for accesses to lower parts of the engine. Such a second retracted position is achieved when retractable structure 55 is in an advanced position in a space contained between maintenance well 54 and impervious rear base 232, which advanced position is made accessible by the continuation of lateral guiding rails 551 toward the said impervious rear base as illustrated on FIG. 7a.

The benefits of the proposed airplane arrangement are many as compared with the arrangement of a rear engine in the axis of the fuselage.

The combination of a fuselage with a tailcoat tail assembly and a rear engine makes it possible to produce an airplane with a non-pressurized rear fuselage part of limited length and an engine remaining accessible and easily removable for maintenance operations.

The partially buried engine makes it possible to produce more compact, thus lighter-weight, structures and to reduce the wetted area of the nacelle and thus the aerodynamic drag.

The noise emitted by rear engine 51 is masked in the front part on the air intake side by the fuselage because of the flattened shape of the top of the fuselage in the zone of the air intake and by the fact that the engine is partially buried in the fuselage and the noise emitted, represented by diffusion directions 57 on FIG. 7b, in the rear part on the engine nozzle side is masked by movable retractable structure 55 toward the rear when the latter is placed in extended position when the airplane is close to the ground.

In this way the airplane according to the invention turns out to be less noisy for a given total thrust than a conventional airplane.

In one embodiment of the airplane of the invention, the rear engine is of the same type as the other engines of the airplane installed beneath the wing group in order to achieve a maximum community of the propulsive system.

In another preferred embodiment, the rear propulsive assembly comprises an engine with greater thrust than that of the engines beneath the wing of the airplane, which improves the airplane according to the invention on the acoustic level by reducing the thrust necessary for the engines beneath the wing, engines not benefiting from the acoustic masking of the fuselage, and moreover makes it possible, through smaller dimensions of the engines beneath the wing, to reduce the height of the landing gears of the aircraft and thus the weight thereof.

In a variant not described, the rear propulsive assembly comprises two engines arranged side by side, the dimensions of the fuselage, in particular the width, and the engine frames then being adapted to this configuration.

The invention claimed is:

1. An airplane comprising:
   a fuselage including at least one wing attached to the fuselage between a front end and a rear end of the fuselage, the fuselage having a substantially cylindrical central part and a tapered rear part joined to the central part at a connecting section, onto which a vertical tail assembly is attached and onto which a rear propulsive assembly is attached substantially at a vertical symmetry plane of the fuselage,
   wherein, in the tapered rear part:
   a maximum height of each section of the fuselage decreases toward a rear of the airplane so that the rear end of the fuselage forms a trailing edge with a width L;
   a maximum width of each section of the fuselage increases continuously, the maximum width being locally constant or increasing toward the rear of the airplane, from a maximum width of the connection section up to the width L, the width L being greater than the maximum width of the connecting section;
   a rear engine of the rear propulsive assembly is situated in a rear part of the fuselage so that a lower part of the rear engine, at a maximum diameter of the rear engine, is partially inside the fuselage and an upper part of the rear engine is on top of the fuselage according to a semi-buried configuration; and the rear propulsive assembly includes a nacelle having shapes which join with the rear part of the fuselage on each side of the nacelle.

2. The airplane according to claim 1, wherein the rear part of the fuselage includes, on each side of the rear propulsive assembly, a fuselage control surface joined onto the fuselage around an axis substantially horizontal to an airplane reference line and the trailing edge corresponding to the rear end of the fuselage.

3. The airplane according to claim 2, wherein the vertical tail assembly includes two substantially vertical stabilizers attached to the rear part of the fuselage in front of the fuselage control surfaces, each stabilizer being integral with the fuselage on one edge, right and left respectively of the airplane, of the rear part of the fuselage.

4. The airplane according to claim 3, wherein the stabilizers include longerons, the longerons of the stabilizers being arranged along a longitudinal direction of the airplane on the rear part of the fuselage in relation to the rear engine so that the longerons are outside a zone of ejection of debris from the rear engine.

5. The airplane according to claim 4, wherein the fuselage includes a movable structure having at least one retracted position in which the movable structure is situated inside the rear part of the fuselage and having at least one extended position in which the movable structure forms an extension toward a rear of the trailing edge of the fuselage at a rear end thereof, substantially in a horizontal plane of an airplane reference line and beneath the rear propulsive assembly.

6. The airplane according to claim 1, wherein a front end of the rear engine is situated along a longitudinal direction of the airplane behind an impervious rear cabin base of the fuselage.

7. The airplane according to claim 6, wherein the rear part of the fuselage includes, behind the rear cabin, base load-carrying frames, wherein the load-carrying frames comprises stabilizer frames configured to take up stresses introduced into the fuselage by the longerons, wherein the load-carrying frames comprises engine frames, the engine frames each including in respective upper parts thereof an arch having an opening with substantially the dimensions of an air intake of the rear engine, and the engine frames being arranged in front of the rear engine in order to have sufficient structural strength for taking up stresses introduced into the fuselage by the rear engine.

8. The airplane according to claim 7, wherein the rear engine is attached and suspended beneath a structural beam cantilevered behind the engine frames, the structural beam being integral with the arches of the engine frames.

9. The airplane according to claim 8, wherein the rear part of the fuselage comprises two longitudinal ribs, substantially in a vertical plane in an airplane reference line, integral with at least one of the load-carrying frames and extending cantilevered behind a rear load-carrying frame toward the rear of the airplane substantially up to the rear end of the fuselage, the ribs defining between them beneath the rear engine a maintenance well clear of any obstacle, via which the rear engine may be removed by gravity.

10. The airplane according to claim 9, wherein a rear frame comprises two outer portions integral with the longitudinal ribs on the side opposite the maintenance well onto which the fuselage control surfaces are joined.

\* \* \* \* \*